(No Model.) 9 Sheets—Sheet 1.

H. ABBOTT.
CALCULAGRAPH.

No. 583,320. Patented May 25, 1897.

Witnesses
Chas. J. Williamson
Henry C. Hazard

Inventor
Henry Abbott, by
Dindle and Russell, his Attys (No Model.) 9 Sheets—Sheet 3.

H. ABBOTT.
CALCULAGRAPH.

No. 583,320. Patented May 25, 1897.

Witnesses
Chas. J. Williamson
Henry C. Hazard

Inventor
Henry Abbott, by
Prindle and Russell his Attys (No Model.)  9 Sheets—Sheet 4.

H. ABBOTT.
CALCULAGRAPH.

No. 583,320.  Patented May 25, 1897.

Witnesses
Chas. J. Williamson.
Henry C. Hazard

Inventor
Henry Abbott, by
Brindle and Russell, his Attys (No Model.)  9 Sheets—Sheet 5.

H. ABBOTT.
CALCULAGRAPH.

No. 583,320.  Patented May 25, 1897.

Witnesses
Chas. J. Williamson.
Henry C. Hazard.

Inventor
Henry Abbott, by
Prindle and Russell, his Attys (No Model.)  9 Sheets—Sheet 6.

H. ABBOTT.
CALCULAGRAPH.

No. 583,320.  Patented May 25, 1897.

Witnesses
Chas. J. Williamson.
Henry C. Hazard.

Inventor
Henry Abbott, by
Dindle and Russell, his Attys (No Model.) 9 Sheets—Sheet 7.
H. ABBOTT.
CALCULAGRAPH.
No. 583,320. Patented May 25, 1897.
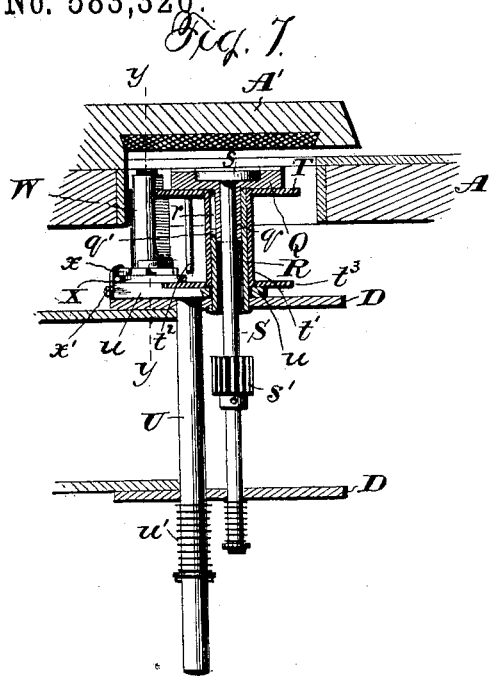
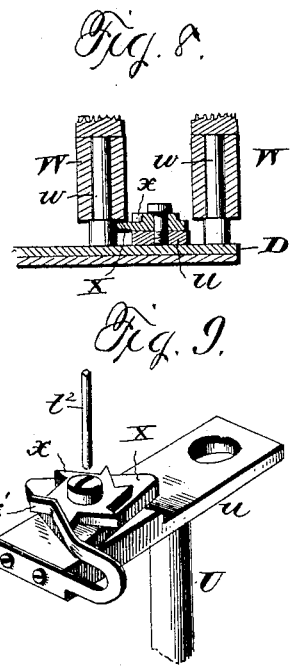
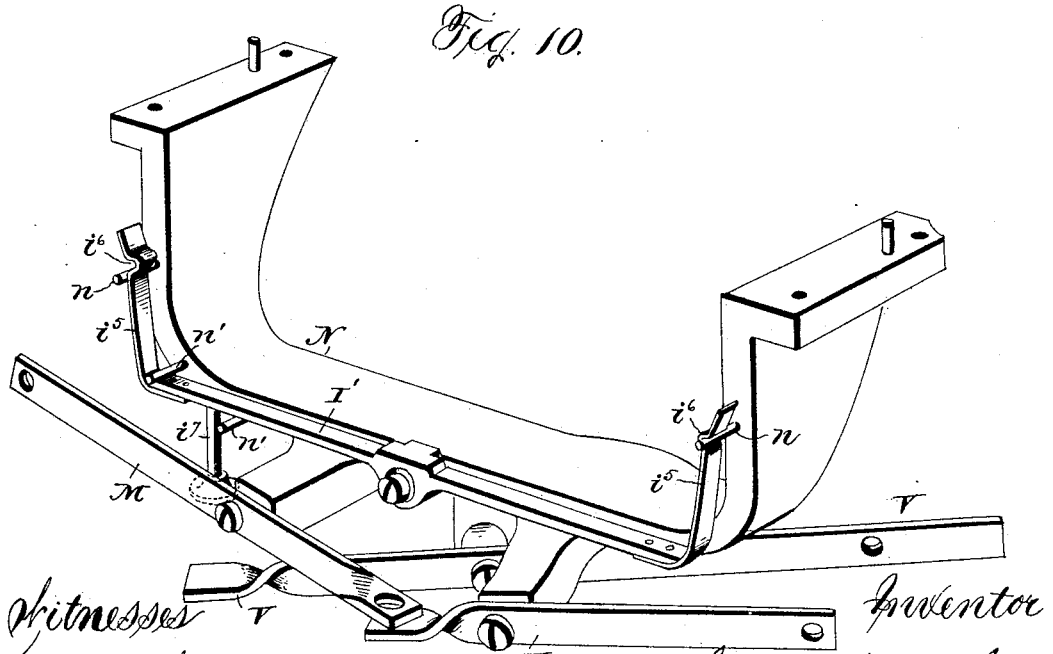
Witnesses
Chas J Williamson
Henry C Hazard
Inventor
Henry Abbott, by
Prindle and Russell, his Attys
THE NORRIS PETERS CO., PHOTO-LITHO., WASHINGTON, D. C.

(No Model.) 9 Sheets—Sheet 8.

H. ABBOTT.
CALCULAGRAPH.

No. 583,320. Patented May 25, 1897.

Witnesses
Chas. J. Williamson,
Henry C. Hazard

Inventor
Henry Abbott, by
Dindle and Russell, his Attys (No Model.) 9 Sheets—Sheet 9.

H. ABBOTT.
CALCULAGRAPH.

No. 583,320. Patented May 25, 1897.

Witnesses
Chas. Williamson,
Henry C. Hazard.

Inventor
Henry Abbott, by
Prindle and Russell, his attys.

UNITED STATES PATENT OFFICE.

HENRY ABBOTT, OF NEW YORK, N. Y., ASSIGNOR TO THE CALCULAGRAPH COMPANY, OF EAST ORANGE, NEW JERSEY.

CALCULAGRAPH.

SPECIFICATION forming part of Letters Patent No. 583,320, dated May 25, 1897.

Application filed November 11, 1895. Serial No. 568,634. (No model.)

*To all whom it may concern:*

Be it known that I, HENRY ABBOTT, of New York city, in the county of New York, and in the State of New York, have invented certain new and useful Improvements in Calculagraphs; and I do hereby declare that the following is a full, clear, and exact description thereof, reference being had to the accompanying drawings, in which—

Figure 1:
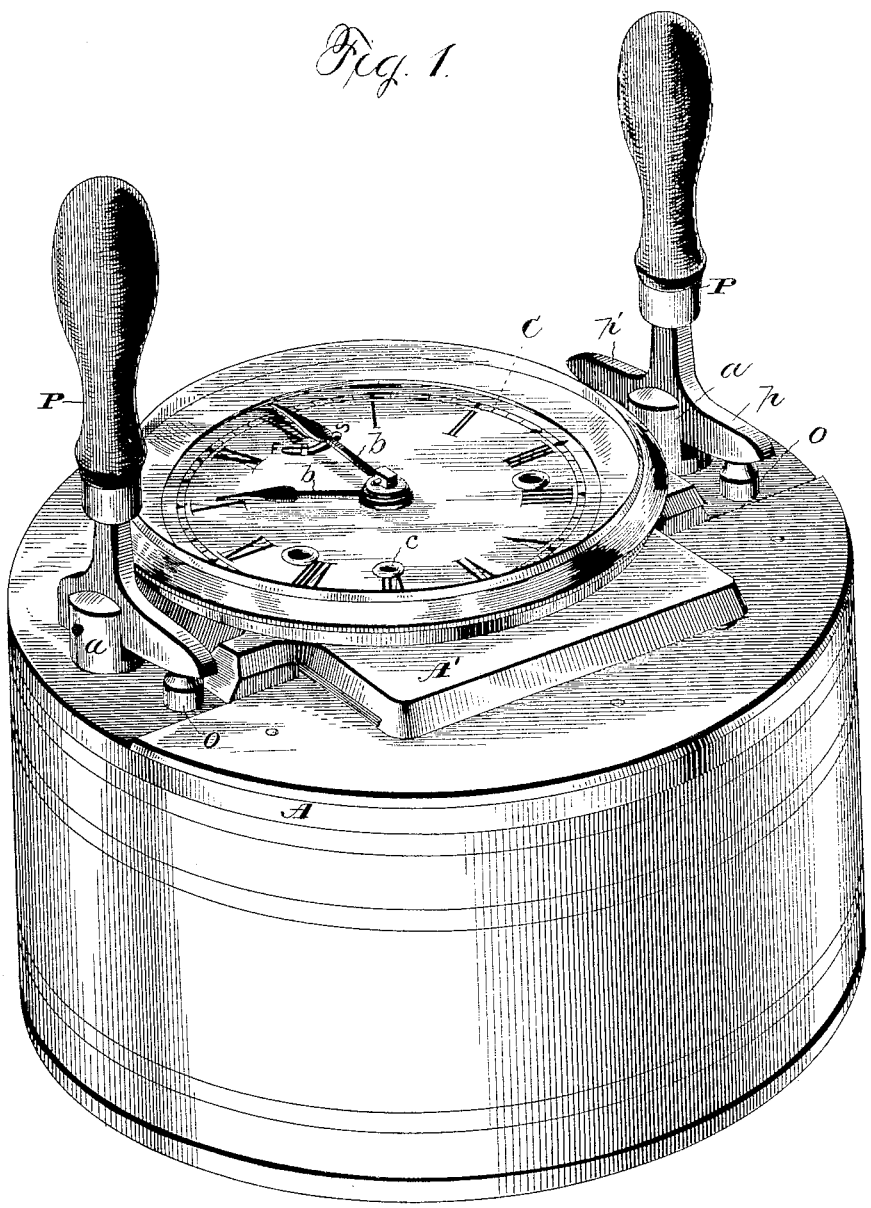
Figure 2:
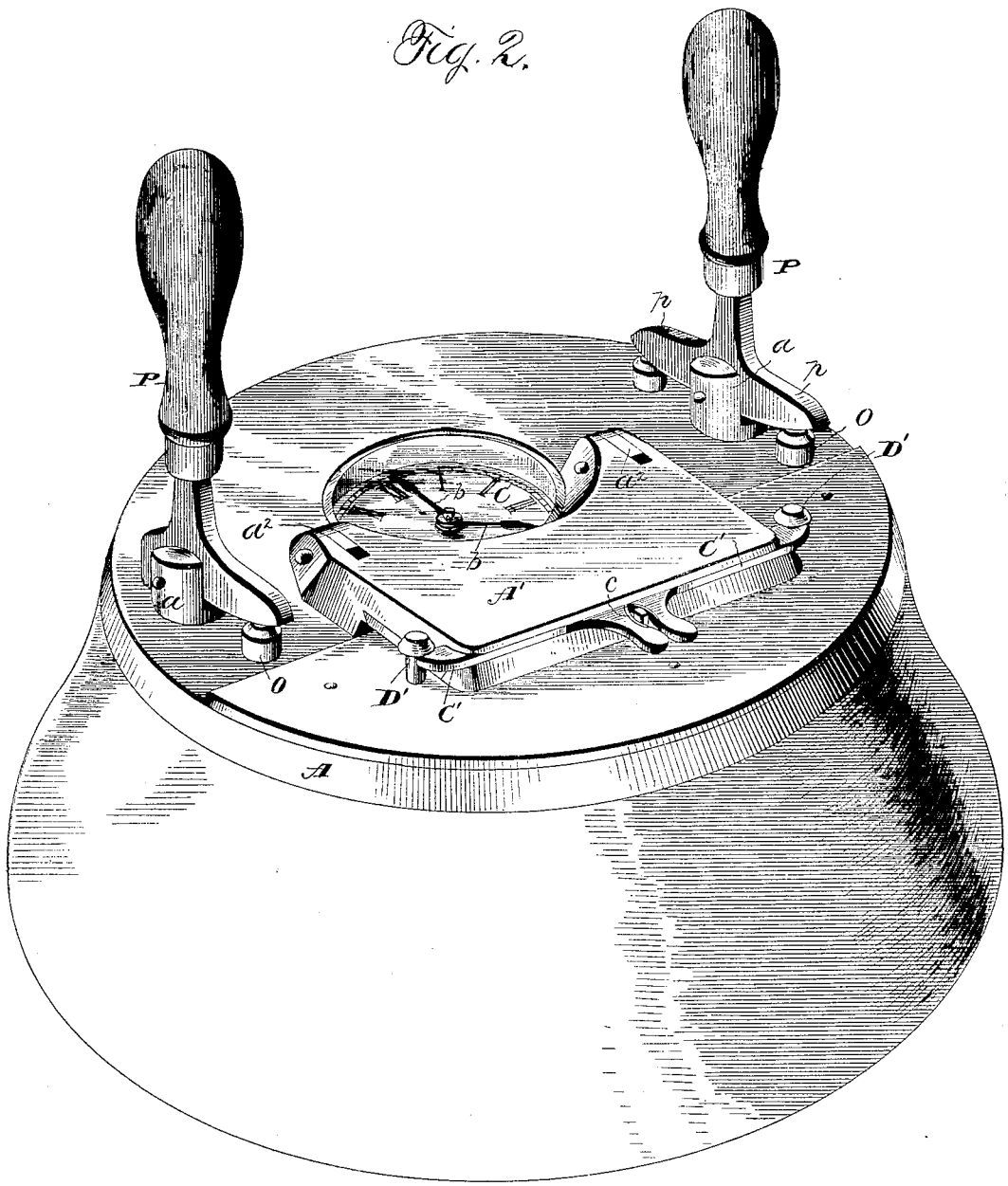
Figure 3:
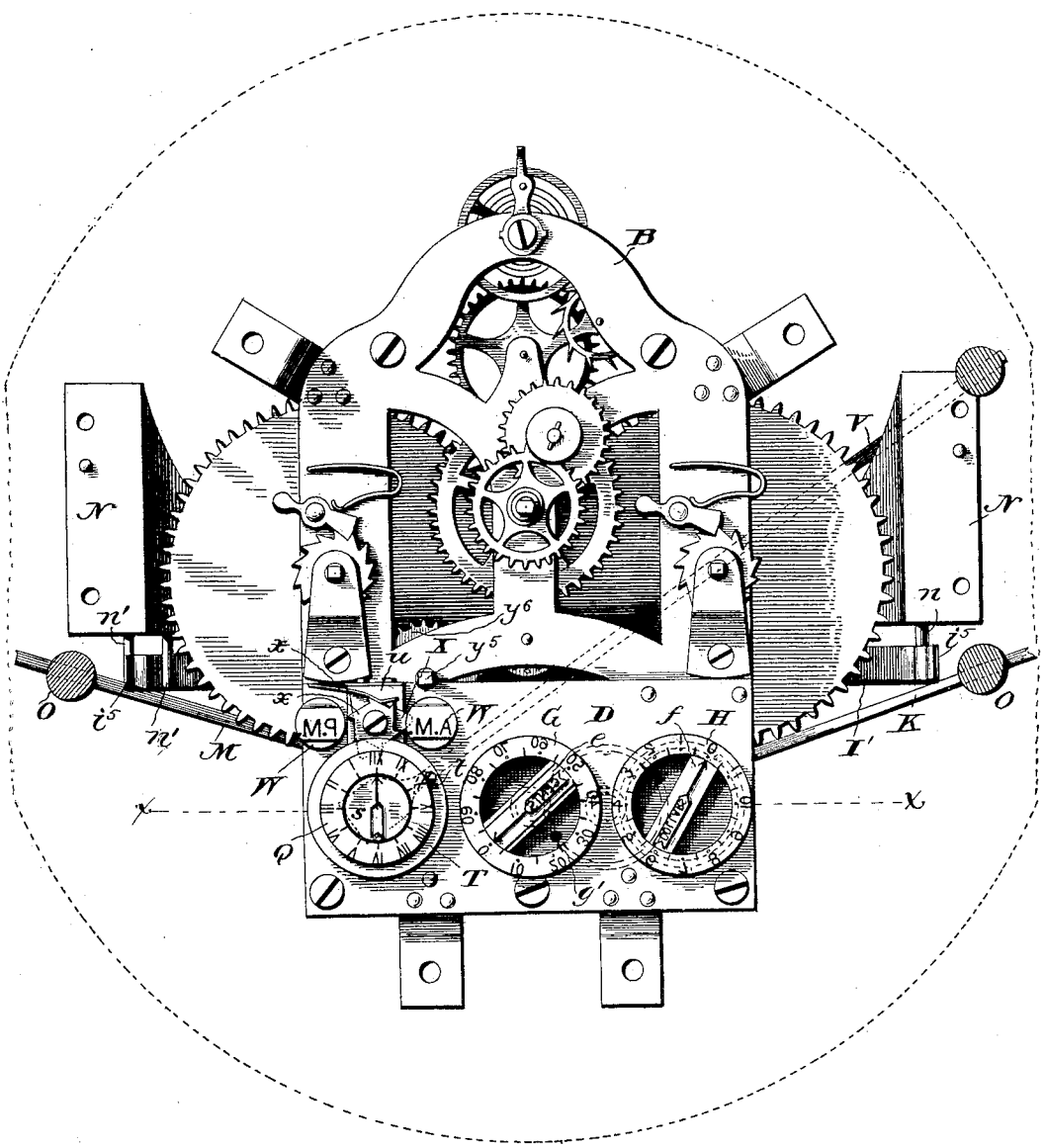
Figure 4:
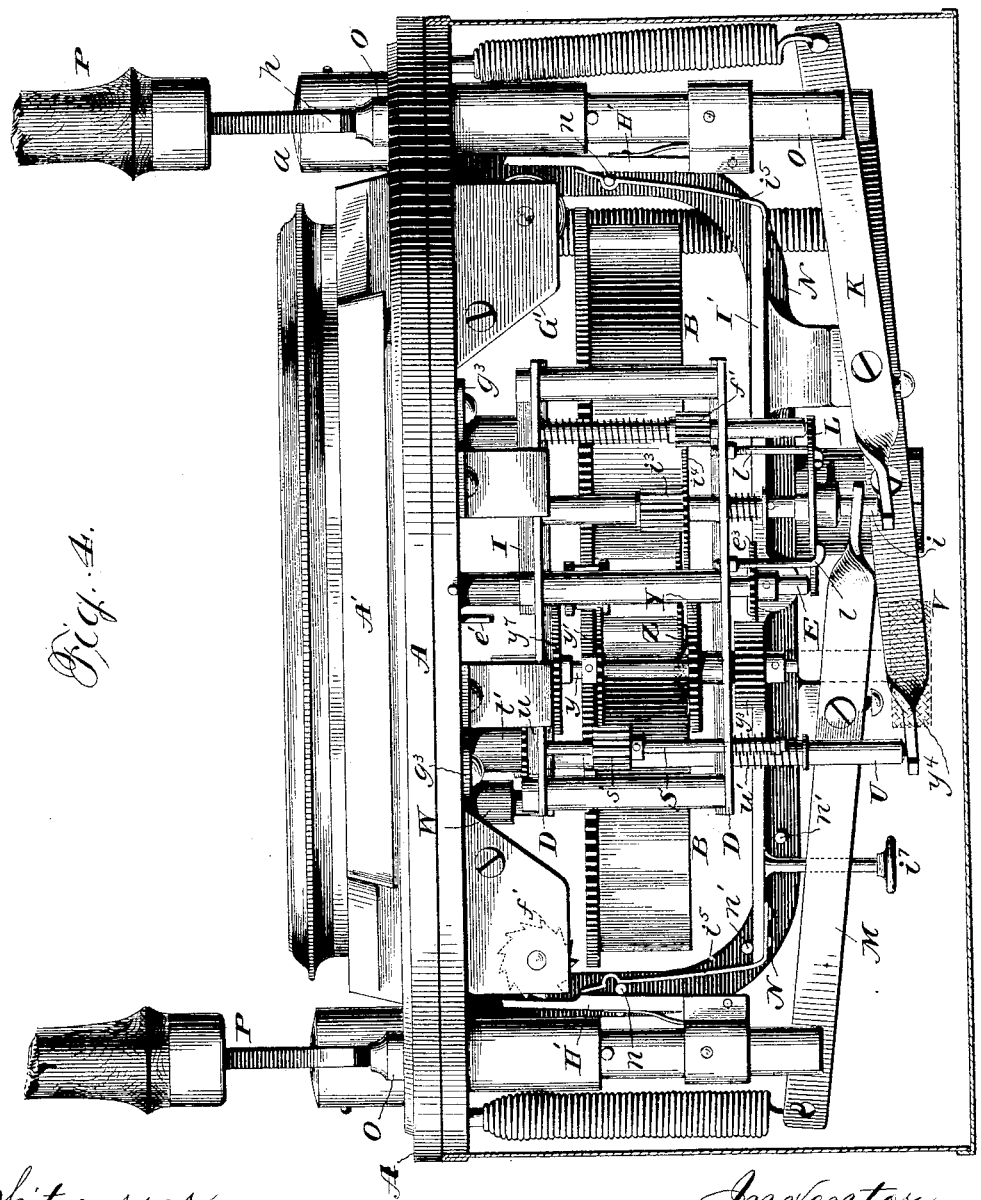
Figure 5:
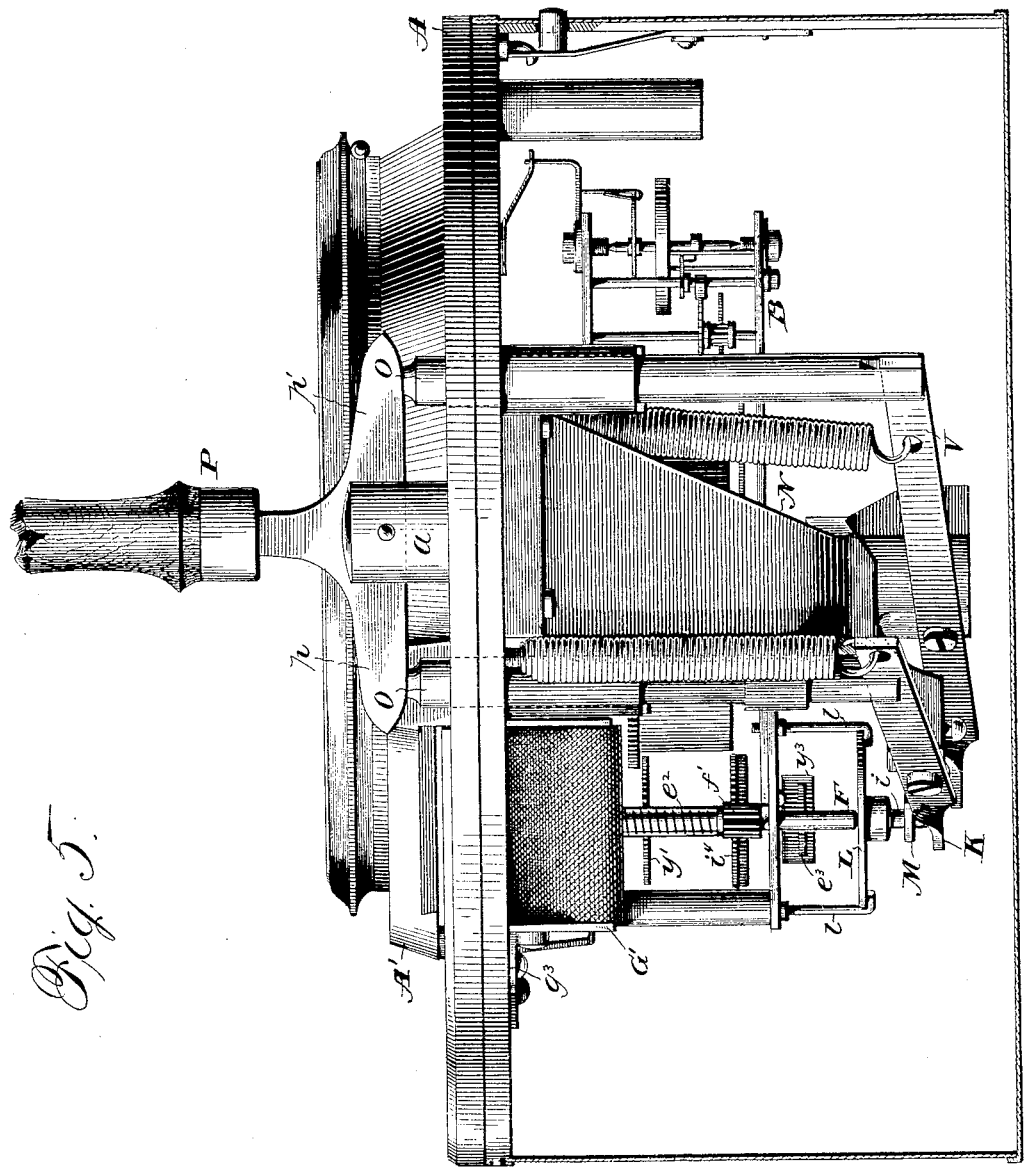
Figure 6:
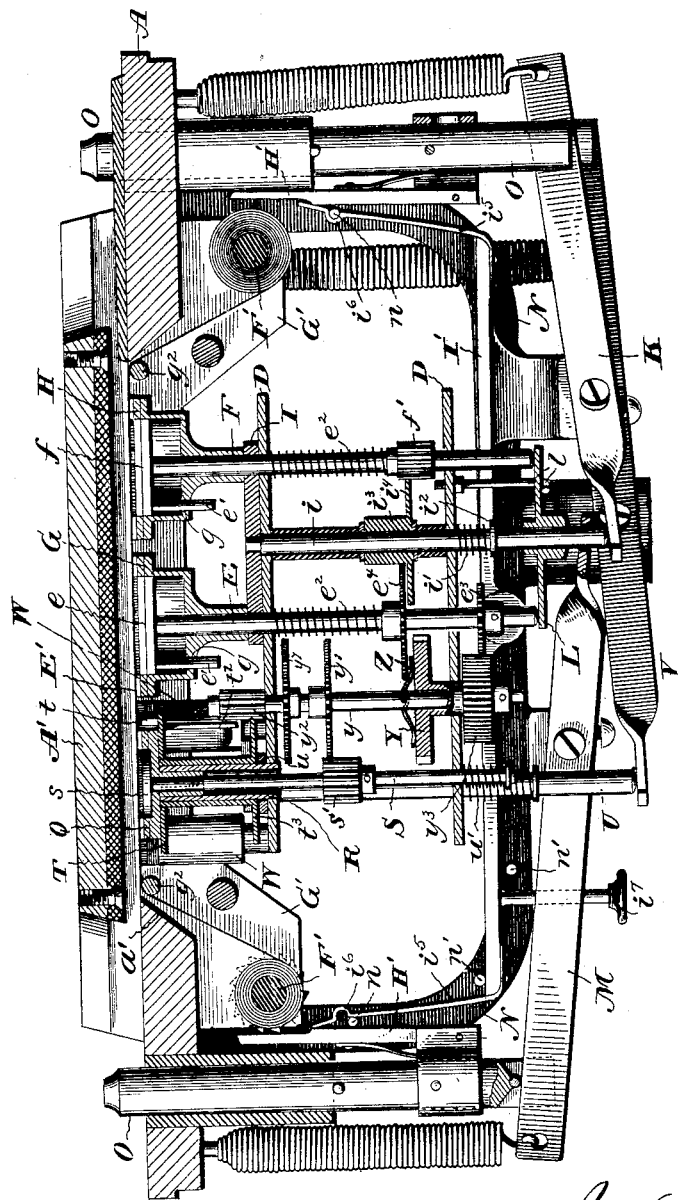
Figure 11:
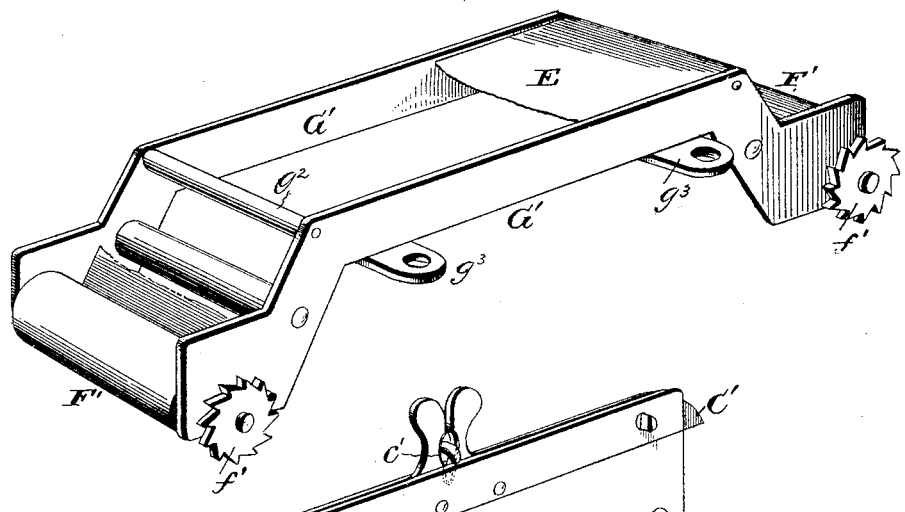
Figure 12:
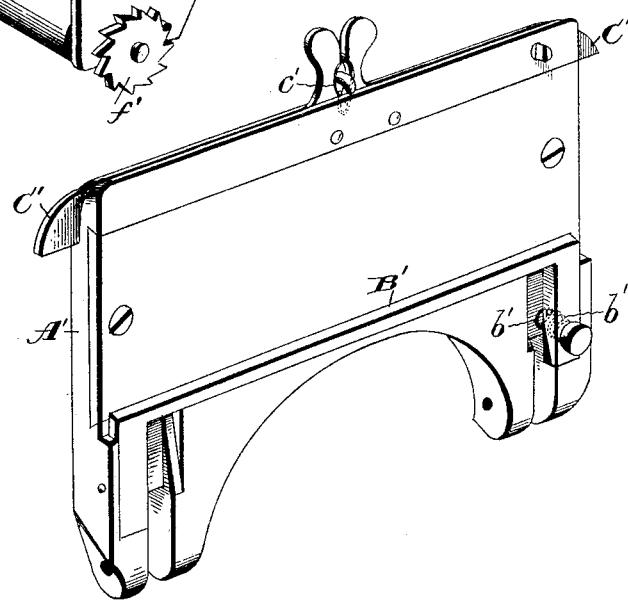
Figure 13:
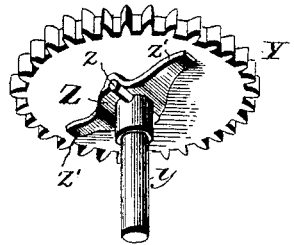
Figure 14:
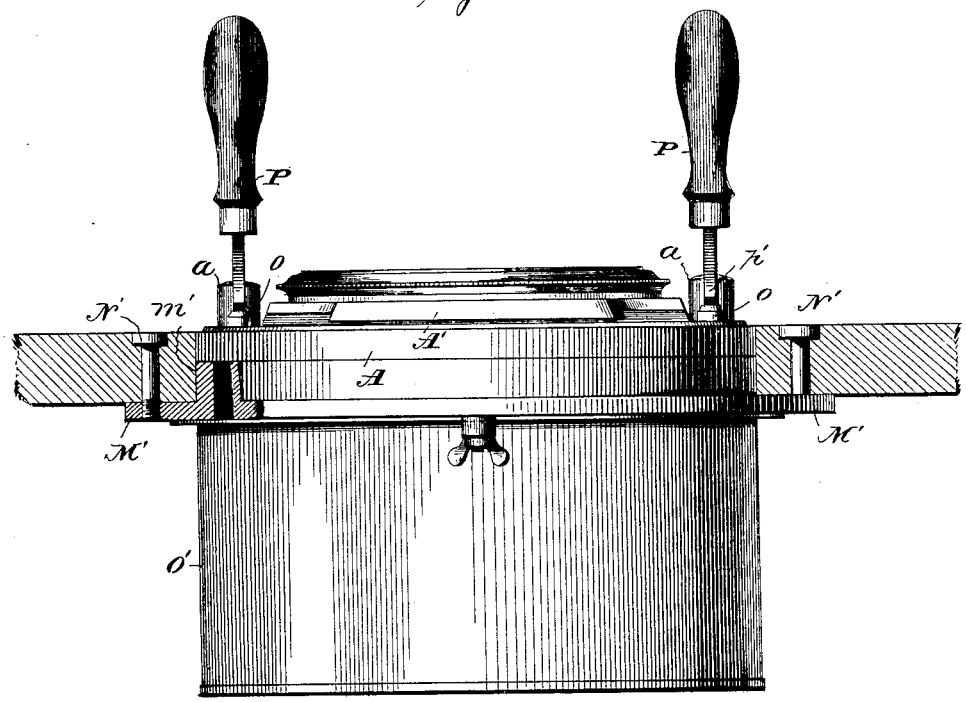
Figure 15:
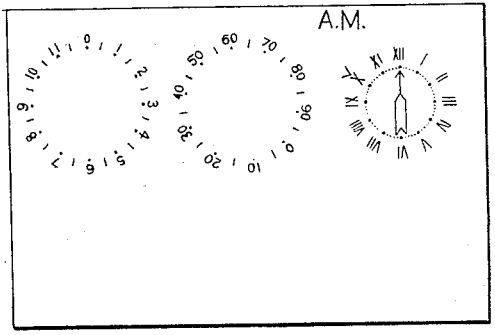
Figure 16:
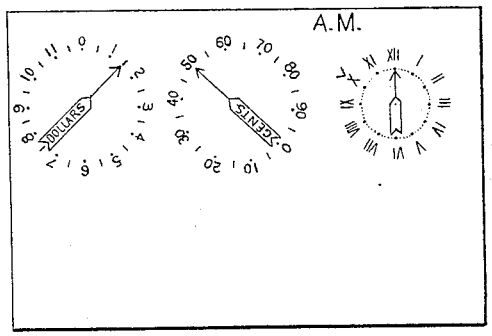

Figure 1 is a perspective view of one form of my machine. Fig. 2 is a like view of another form. Fig. 3 is a plan view with the top plate removed. Fig. 4 is a front elevation thereof with the casing shown in section. Fig. 5 is a side elevation with the casing in section. Fig. 6 is a vertical section on the line $x\,x$ of Fig. 3. Fig. 7 is a detail view in section of the time-of-day printing devices. Fig. 8 is a section on line $y\,y$ of Fig. 7. Fig. 9 is a detail perspective view of the mechanism for causing the printing of "A. M." and "P. M." at the appropriate times. Fig. 10 is a detail view in perspective of the lever pivoting bar or frame. Fig. 11 is a like view of the ink-ribbon-carrying frame. Fig. 12 is a perspective view, from the under side, of the hinged platen. Fig. 13 is a detail view of the friction device for connecting the gear and its arbor, by which the recording mechanism is connected with the clock-train. Fig. 14 is a view, partly in elevation and partly in section, showing a mode of supporting my mechanism upon a bench. Figs. 15 and 16 are views, respectively, of a card when printed at the beginning and end of an interval to be recorded.

Letters of like name and kind refer to like parts in each of the figures.

The object of my invention is to provide an improved mechanism for recording measurements of time, quantity, value, &c., and my purpose more especially has been to better the machine shown in my United States Patent No. 449,192, issued March 31, 1891, whereby it may be rendered more efficient, convenient, and satisfactory in use and its field of work enlarged; and to these ends said invention consists in the apparatus and the parts thereof constructed substantially as hereinafter specified.

In the carrying of my invention into practice the operative parts of my mechanism are supported by a metal plate A, which forms the top of a casing that otherwise may be constructed of any preferred material and given any desired shape to suit the fancy or to adapt the machine to the use for which it is designed. Of course I do not limit myself to any particular shape or material in constructing the plate A. Secured to the under side of said plate A is a time-train B of any usual construction by which the registering mechanism to be described is driven and which is further utilized as an ordinary clock by the employment of hands $b$ and $b$ and a dial C, that are visible from the upper side of the plate A.

Journaled between two plates D and D, which are extensions of or are attached to the clock-movement plates, are two parallel vertical arbors E and F, which upon their upper ends carry each one of two bars $e$ and $f$, that respectively are connected with, so as to rotate, two cylindrical blocks G and H, arranged concentrically upon the arbors E and F. The upper face of each of said blocks carries an annular printing-die containing the matter to be printed appropriate to the kind of units in which the record is to be made. Such units, for example, may be units of time, in which case one die will be arranged to print hours and the other minutes, or the units may be units of money value. The latter is illustrated in Fig. 3, where one die, G, is shown as divided into twenty equal divisions, alternate ones of which are numbered consecutively from "0" to "90" and indicate cents, while the other one, H, is divided into twenty-four equal divisions, alternate ones of which are numbered consecutively from "0" to "11" and indicate dollars, said arrangement of dies being designed to record the pecuniary value of time. Each of the bars $e$ and $f$ carries upon its upper face a printing-die having the shape of an arrow, and under ordinary conditions each bar and its cylinder are secured in such relative position that the arrow points toward the zero-mark of the cylinder-die. The means I preferably employ to rotatively connect each bar and cylinder consists of a pin $e'$, that projects downward from the bar, and an opening $g$ in the bottom of the cylinder that is engaged by the pin. As the cylinder and bar are vertically movable independently of each other to cause printing by their respective dies, the pin $e'$ is given such length as to prevent its disengagement from the opening $g$ during such movement.

For moving the two annular dies upward to cause them to print each rests upon one end of a horizontal bar I, that at its longitudinal center is attached to the upper end of a vertically-movable rod $i$, which passes through suitable openings in the two plates D and D and at its lower end is adapted to be engaged and raised by a lever K, that is actuated in the manner to appear. A coiled spring $i'$, interposed between the bottom plate D and a collar $i^2$ upon said rod, operates to draw the latter downward, while the weight of the die-cylinders is sufficient to cause them to drop.

The two arbors E and F rest at their lower ends upon a plate L, that is mounted slidingly upon the rod $i$ and is adapted to be engaged upon its under side and raised by a lever M, similar to the lever K, and thus lift the arrow die-bars to cause them to print. A coiled spring $e^2$, encircling each arbor E and F, is provided to supplement the weight of the parts to cause the dropping of said die-bars from printing position. The plate L is held from falling too far by means of two rods $l$ and $l$, that depend from the bottom plate D and have inturned ends that pass beneath said plate L at diametrically opposite points.

The two levers K and M are pivoted between their respective ends to a U-shaped bar or frame N, that is secured by screws to the under side of the plate A, and said levers extend in opposite directions to enable their operating mechanisms, which act on their outer ends, to be separated as far as possible to avoid the accidental operation of one instead of the other. In each instance such operating mechanism consists of a vertical rod O, that at its lower end is slotted to straddle the lever and at its upper end passes through an opening in the plate to the upper side thereof, where it is engaged by the horizontal arm $p$ of a lever P, that is pivoted to a block $a$ upon the upper side of the plate and provided with a handle for its convenient manipulation. Each lever K and M is moved oppositely to the movement given by its hand-lever by a coiled spring that has one end attached to the under side of the plate A and the other end to the lever. Said spring, by holding its lever in position in the slotted end of the respective rod O, obviates the use of a pin or other positive connection between the lever and post.

The employment of a pivoted handle or lever to depress the rod O', instead of striking or pounding upon the same with the hand, the usual manner in mechanism of this description, is of decided advantage, as the disagreeable and sometimes painful effect on the operator's hand and the noise and jar incident to the striking or pounding are wholly obviated. The avoidance of noise is quite an important consideration when, for instance, the apparatus is employed in telephone-exchanges, and of course it is desirable to obviate the jarring because of its injurious effect upon the machine itself, and also upon other mechanism that might happen to be upon the same support or table therewith. Furthermore, by reason of the even gentle pressure, instead of the sudden violent blow imparted by the old construction, a cleaner and better impression, free from blurring, is obtained.

For printing the time of day the following-described mechanism is employed: Arranged in line with the printing-dies described is a third annular die Q, marked off into twelve divisions corresponding to the dial of a timepiece, said die being supported and guided when moved vertically by a tubular post or support R, attached to and projecting above the top plate D, into which post a tubular extension $q$ of the die extends. Although movable vertically the die Q is held from rotating by a pin $q'$, that projects radially from the extension $q$ into a vertical slot $r$ in the post R. Carried upon the upper end of an arbor S, arranged within and concentric with the die Q, is a disk $s$, that has upon its upper face a die in the form of a pointer or arrow that corresponds to the minute-hand of a timepiece, while to designate the hour a die $t$ in the form of a pointer is carried by a stud or post located outside of the die Q and mounted upon a disk T, that is journaled upon the post R. The minute-pointer is thus within the dial and the hour-pointer outside of the same. As the dial-die Q rests upon the disk T and the minute-pointer disk $s$ rests upon an inwardly-projecting flange of said dial-die, all three of said dies may be raised simultaneously to print. The lower end of a sleeve or tubular shaft $t'$ on the under side of the disk T rests upon the upper side of a horizontal bar $u$, that is secured to the upper end of a vertically-movable rod U, and said rod is adapted to be engaged and raised by a lever V, similar to the levers K and M and pivoted to the frame N and actuated by one of the hand-levers P. The hand-lever used is preferably that which causes the printing of the annular dies G and H, and having an arm $p'$ extending opposite to the arm $p$, so that upon being moved alternately in opposite directions it may cause the printing of the two annular and the time-of-day dies. A coiled spring $u'$ upon the rod U moves the latter downward in opposition to the lever.

For indicating that the time of day printed is either "A. M." or "P. M.," as the case may be, there are provided two dies that respectively bear said characters, each being mounted upon the top of a block W, that is arranged vertically movable upon a rod $w$, secured to the top plate D. The blocks W and W are placed upon opposite sides of the lifting-bar $u$, and pivoted upon the upper side of the latter is a triangular-shaped plate X, whose angles are adapted to be placed alternately beneath one block or the other, so that upon the lifting of the bar $u$ the block W having the angle beneath it will be lifted and the die carried thereby caused to print. Upon the upper side of said plate X there is provided a star-wheel $x$, having six points or teeth, which are adapted to be successively engaged and the wheel thereby rotated through the space of one tooth by means of a downwardly-projecting pin $t^2$ on the disk T. As the latter revolves but once in twelve hours, it will be seen that at every twelfth hour the star-wheel will be rotated one-sixth of a revolution, and in consequence one angle of the triangular plate will be moved from one block and another placed under the other block. Of course twelve o'clock is the time selected for this operation to take place.

A flat spring $x'$, fixed to the bar U and having its free end adapted to bear against the teeth of the wheel $x$, is provided to insure the completion of the movement of the same to shift the position of the triangular plate and to yieldingly hold said plate in its shifted position.

The clock-train is geared to a wheel Y upon an arbor $y$, journaled vertically within openings in the two plates D and D, and thus is adapted to revolve said arbor, and upon the latter is a wheel $y'$, that meshes with a pinion $s'$ upon the minute-pointer arbor S to revolve said pointer, while to revolve the hour-pointer a pinion $y^2$ upon the upper end of said arbor $y$ meshes with and drives a wheel $t^3$ at the lower end of the disk-shaft $t'$. The printing-dies G and H also receive their revolution from said arbor $y$, a wheel $y^3$ being placed on the latter that meshes with a pinion $e^3$ on the arbor E of the arrow of the die G. When the units of higher denomination are placed on the die H, as shown in Fig. 3, the gearing between the two arbors E and F must of course be such as to cause said die H to be run slower than the die G. This arrangement, however, may be reversed and, as shown in Figs. 4, 5, and 6, the arbor F be rotated the faster, the die H then carrying the units of lower denomination. As shown in said figures, motion from said arbor E is transmitted to the other arbor F by gearing consisting of a wheel $e^4$ on the former arbor, that meshes with a pinion $i^3$, journaled loosely on the lifting-rod $i$, and a wheel $i^4$, connected with said pinion, that meshes with a pinion $f'$ on said second-named arbor F.

The wheel $y^3$ and pinion $e^3$, that gear the arbor $y$ to the dies G and H, are placed beneath the lower plate D, so as to permit their easy removal and the substitution of differently-proportioned wheels and pinions to enable the rate at which said dies are revolved to be readily changed to meet varied requirements in this regard.

Since it may be necessary to set the time-of-day mechanism, and as so to do would, unless guarded against, derange the record being made by the dies G and H, both of said mechanisms being geared to and driven from the arbor $y$, the wheel Y is not positively fixed to the arbor $y$, but is held frictionally thereon, the connecting means being a plate Z, that encircles the arbor and is secured thereto by a pin $z$ and has two spring-arms $z'$ $z'$, that bear against the side of the wheel Y with sufficient force to cause the same to drive the arbor. When power is applied to said arbor, however, to set the time-of-day mechanism, the friction will be insufficient to revolve the wheel, as said wheel is geared to the clock-movement and is thereby held from rotation. It is of course also necessary that the wheel $y^3$ be mounted upon the arbor $y$ frictionally and not positively, so as to permit said arbor to be independently rotated, and it has a suitable connection with the wheel Y to enable the latter, when held from rotation by reason of its connection with the clock-movement, to hold said wheel $y^3$ from turning. A turning head $y^4$ (shown in dotted lines, Fig. 4) may be applied to the lower end of the arbor $y$ for setting purposes, or, if preferred, an arbor $y^5$, accessible through an opening $c$ in the clock-dial (see Figs. 1 and 3) and geared by a wheel $y^6$ thereon with a wheel $y^7$ on the arbor $y$, (see Fig. 4,) may be employed.

As it is customary in many instances, as in bicycle and carriage hiring, &c., to change the rate charged per hour after the first hour—as in the former case to charge, say, fifty cents for the first hour and twenty-five cents for each succeeding hour—it is very desirable to have a mechanism capable of use under these conditions. To adapt my machine to such use, I provide in the instance named an opening or hole $g'$ in the annular cents-die block $i$ for the reception of the pin $e$ of the arrow-die block, which will hold said arrow-die pointing toward the twenty-five-cent mark instead of zero and gear the dies to run at the rate of twenty-five cents per hour. Virtually this amounts to starting in with a charge of twenty-five cents, and, it will be seen, results in a charge of fifty cents at the completion of the first hour, seventy-five at the end of the second, and so on. Of course the same idea can be carried out where other units of measurement than money-units are used, although, manifestly, it will be practiced principally in connection with the latter. The platen employed consists of a plate A', arranged over the several dies, which has its under face covered with rubber or other yielding material, against which the dies act in printing on an interposed card or piece of paper, the supporting-plate A being provided with an opening $a'$, through which the dies may move.

For printing upon cards or sheets of paper of sufficient stiffness to be readily passed beneath the platen the latter may be immovably secured in place, as shown in Figs. 1 and 5, but for use with thin cards or paper the construction shown in Figs. 2 and 12 is employed. In this instance the plate A' is hinged at its rear edge to lugs $a^2$ and $a^2$ upon the upper side of the plate A, so as to permit access to the under side thereof for the easy placing in position of the card or paper to be printed, and the latter is securely held in such position by means of a pivoted clamping-bar B', that binds one edge of the card or paper against the platen. A spring $b'$ (shown in dotted lines, Fig. 12) holds the bar B' yieldingly in paper-clamping position.

A latch consisting of two pivoted bars C' and C', adapted to respectively engage the heads of studs D' and D', attached to the plate A, adjacent to opposite ends of the plate, is provided to securely hold the platen down when the dies are pressed against the same for printing. A spring $c'$ (see Fig. 12) is employed to yieldingly hold the bars C' and C' in engagement with the studs D' and D'. Of course should the size of the card or sheet to be printed necessitate it one of the studs and locking-bars may be omitted.

Ink for printing is supplied by a ribbon E', that is wound upon two spools F' and F', journaled at the opposite ends of a frame composed of two suitably-connected parallel plates G' and G', (see Fig. 11,) which are provided with two parallel guide and supporting rods $g^2$ and $g^2$, to and over which the ribbon passes from the spools and by which it is held straight and smooth over the dies. Each plate G' has two horizontal lugs $g^3$ and $g^3$, through which screws may pass to fasten the frame to the under side of the plate A, and as the ribbon and spools are supported wholly by said frame it will be seen that the removal and replacement of the inking mechanism is a very easy and simple thing. Both spools F' and F' are provided with a ratchet-wheel $f'$ each, which wheels are adapted to be respectively engaged and rotated to feed the ribbon longitudinally by means of pawls H' and H', pivoted at their lower ends to the vertically-movable rods O and O. Each pawl H' has a spring to normally press it into engagement with its ratchet-wheel; but as it is desirable that both should not be in operative position at the same time I provide means whereby one may be thrown out of position when the other is to act. Said means consists of a straight bar or rod I', pivoted at mid-length to the side of the frame-bar N and carrying at each end an upwardly-extending spring-finger $i^5$, which is adapted by the swinging of the bar I' to alternately engage a pawl H' and move and hold the same from operating on its ratchet-wheel. Just below its upper end each finger $i^5$ has a groove $i^6$, that is adapted to fit over a pin $n$, that projects horizontally from the frame-bar N, and when said groove does so engage the pin the finger $i^5$ is engaged and held out of operative position by the finger. Where the latter is moved by the rocking of the bar I' to disengage the groove from the pin, the pin by engaging a flat portion of the finger moves and holds the same out of contact with the pawl, and the latter is then free to act upon its wheel. The movement of the bar I' is limited by stop-pins $n'$ and $n'$, projecting from the frame-bar N, that respectively engage its upper and lower sides, and preferably a handle $i^7$ is provided upon said bar I' to enable it to be conveniently manipulated. As the bar I' and the three levers K, M, and V are all attached to the frame-bar N, it will be seen that the removal of all of these parts from the machine and their replacement can be effected simply by detaching and replacing said bar N.

In Fig. 14 I show a manner of mounting and supporting my machine which is very desirable when the same is to be placed upon a wooden bench. An opening is formed in the latter in which the machine is placed, with the face of the plate A flush with the surface of the bench and with said plate resting upon the vertical flange $m'$ of a horizontal metal ring M', that is held to the under side of the bench by screws N', which pass down through the table into the ring. By the use of the latter the screws thus enter metal instead of wood, and a firm support for the machine is provided. A light casing O' is placed over the exposed portions of the mechanism beneath the table and is detachably connected to the ring M' to permit ready access to said mechanism from beneath.

The operation of my machine when the record is to be made in units of money value is as follows: The card or paper to be printed upon having been placed in position under or upon the platen, the hand-lever P for causing the printing of the two annular cents and dollars dies and the time-of-day dies is alternately moved in opposite directions. The card when taken from the platen will, as seen in Fig. 15, be found to bear imprints of the two annular dies and show the time of day and "A. M." or "P. M.," as the case might be, when the impression was made. At the end of the interval to be measured the card is replaced beneath or upon the platen in the same position it first had, and then the lever P for causing the printing of the cents and dollars arrow-dies is operated. As the position of said arrow-dies has changed relative to the imprints of the annular dies since such were made, it will be seen that the imprints of the arrows now made will point to divisions on the annular imprints corresponding to the new position of said arrows and show the money value of the elapsed time, which can thus be directly read from the card.

Having thus described my invention, what I claim is—

1. In a machine for making printed records, the combination of dies for printing the record of intervals, dies for printing the time of day, a single motor for driving both sets of dies, and a lever adapted by alternate movements to cause impressions to be made from both sets of dies, substantially as and for the purpose specified.

2. The combination of mechanism for measuring and recording intervals, comprising dial and pointer dies, time-of-day dies, a single lever for actuating the latter, and certain of the former, means for actuating the die or dies not actuated by said lever, and a single motor for driving all of said dies, substantially as and for the purpose set forth.

3. In a recording-machine, the combination of recording mechanism, a time-of-day mechanism, means for printing from each of said mechanisms and gearing between said mechanisms, adapted to permit the setting of the time-of-day mechanism without affecting the recording mechanism, substantially as and for the purpose shown.

4. In a recording-machine, the combination of recording mechanism, a time-of-day mechanism, means for printing from each of said mechanisms, a clock-movement for driving both of said mechanisms, and gearing, whereby the time-of-day mechanism may be set without affecting the recording mechanism, substantially as and for the purpose specified.

5. In a recording-machine, the combination of recording mechanism, a time-of-day mechanism, an arbor to which both of said mechanisms are geared, the connection between one of said mechanisms and the arbor being frictional, and a clock-movement geared to said arbor, substantially as and for the purpose described.

6. In a machine for making printed records, the combination of a supporting-plate, the several sets of dies, levers for actuating said dies to cause them to print, and a single bar or frame to which all of such levers are pivoted, that is removably secured to said supporting-plate, substantially as and for the purpose shown.

7. In a machine for measuring and recording intervals, the combination of an indicator having a progressive series of indices, means for moving said indicator at a certain rate, a pointer to coöperate with said indices, means to print from said indicator, and pointer independently of each other and means for holding the pointer in such relation to the latter that the indication for a certain interval may be in excess of that actually measured by the machine at the rate at which it is run during the interval, substantially as and for the purpose specified.

8. In a machine for measuring and recording intervals, the combination of a rotary part having an annular progressive series of indices, means for rotating said part at a certain rate, a pointer for coöperating with said indices, and means whereby said pointer may be held in indicating position relative to an index of the series between the first and last thereof, substantially as and for the purpose shown.

9. In a machine for measuring and recording intervals, the combination of a rotary die having a progressive series of indices, means for rotating said die, a pointer, and means for holding said pointer in any one of several positions relative to the die-indices, substantially as and for the purpose set forth.

10. In a printing recording mechanism, the combination of time-of-day printing-dies, dies for printing indications of "A. M." and "P. M.," respectively, means for simultaneously moving one of the latter and the time-of-day dies, to cause them to print, and a part carried by said moving means, adapted to alternately engage the dies for indicating "A. M." and "P. M.," substantially as and for the purpose described.

11. In a printing recording mechanism, the combination of time-of-day printing-dies, movable blocks carrying dies for printing "A. M.," and "P. M," respectively, the rotary plate movable alternately into and out of engagement with said blocks, means for moving said plate, and means for simultaneously moving said plate and the time-of-day dies, substantially as and for the purpose shown.

12. In a machine for measuring and recording intervals, the combination of printing-dies, a time-train to drive the same, a supporting-plate, a platen hinged to said plate, having a suitable card or paper clamp, and means for securing said platen whereby it may be held from movement during the making of an impression from the dies, substantially as and for the purpose set forth.

13. In a machine for measuring and recording intervals, the combination of printing-dies, a time-train to drive the same, a supporting-plate, a platen hinged to the top of the latter having a card or paper clamp, and latch mechanism to hold said platen in its lowered position, substantially as and for the purpose described.

14. The combination of two ribbon-holding spools, having each a ratchet-wheel, a pawl for each wheel, a pivoted bar carrying fingers adapted to engage each pawl alternately to throw and hold the same out of engagement with its ratchet-wheel, and a pin for each finger, adapted to coöperate with a groove therein, substantially as and for the purpose shown.

15. In a machine for measuring and recording intervals, the combination of the printing-dies, the motor for driving the same, gearing for connecting the motor and the dies, a supporting-frame for such parts, and gear-wheels for determining the rate at which the motor shall drive the dies placed upon the outside of the frame, whereby they may be readily removed and replaced, substantially as and for the purpose described.

In testimony that I claim the foregoing I have hereunto set my hand this 7th day of September, A. D. 1895.

HENRY ABBOTT.

Witnesses:
EARLE T. CONNET,
JOHN F. SHELLY.